(12) United States Patent
Li et al.

(10) Patent No.: US 8,084,689 B2
(45) Date of Patent: Dec. 27, 2011

(54) HINGE ASSEMBLY AND ELECTRONIC DEVICE USING THE SAME

(75) Inventors: Jian Li, Shenzhen (CN); Shen Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 255 days.

(21) Appl. No.: 12/650,904

(22) Filed: Dec. 31, 2009

(65) Prior Publication Data

US 2011/0120742 A1 May 26, 2011

(30) Foreign Application Priority Data

Nov. 20, 2009 (CN) .......................... 2009 1 0310131

(51) Int. Cl.
*H01H 9/02* (2006.01)

(52) U.S. Cl. .................. 174/58; 174/50; 16/277

(58) Field of Classification Search .................. 174/50, 174/58; 320/107; 16/337, 303, 330, 334, 16/277, 297; 361/679.55, 679.58, 679.26
See application file for complete search history.

(56) References Cited

U.S. PATENT DOCUMENTS

| 5,008,976 A * | 4/1991 | Busch ............................. 16/276 |
| 7,013,532 B2 * | 3/2006 | Lu et al. ......................... 16/337 |
| 7,832,055 B2 * | 11/2010 | Schoolcraft et al. ............ 16/347 |

* cited by examiner

*Primary Examiner* — Dhirubhai R Patel
(74) *Attorney, Agent, or Firm* — Altis Law Group, Inc.

(57) ABSTRACT

A hinge assembly includes a first bracket, a second bracket and a shaft assembly rotatably connecting with the first bracket and the second bracket. The shaft assembly includes a shaft and an elastic member sleeved on the shaft. The shaft extends through the first bracket and the second bracket. The first bracket has a connecting end with a protrusion, the second bracket has a connecting portion defining a curved latching slot and a passing slot communicating with the curved latching slot. The width of the curved latching slot decreases along the curved extending direction, and the width of the protrusion is substantially the same as the width of one end of the curved latching slot, and wider than the other end of the curved latching slot.

20 Claims, 6 Drawing Sheets

HINGE ASSEMBLY AND ELECTRONIC DEVICE USING THE SAME

BACKGROUND

1. Technical Field

The present disclosure generally relates to electronic devices, and particularly to a hinge assembly for a collapsible electronic device.

2. Description of Related Art

A collapsible electronic device such as a notebook computer often has a main body and a cover with a display hinged thereon via a hinge or hinge system. An assistant member is often employed in the hinge for convenient opening of the cover.

A commonly used hinge includes a pivot shaft, a first stand, a second stand, a restricting assembly, and a torsion spring. The pivot shaft includes a shaft portion and a connecting portion formed on an end thereof. The first stand, the restricting assembly, and the torsion spring are sleeved on the shaft portion. The second stand is non-rotatably sleeved on the connecting portion. The restricting assembly includes a cam and a cam follower. The cam is rotatably connected to the shaft portion, and the cam follower is non-rotatably connected to the shaft portion. A plurality of protrusions are formed on a side surface of the cam. The cam follower defines a plurality of notches receiving the protrusions. The torsion spring has two connecting pegs. One connecting peg is connected to the first stand, and the other connecting peg is connected to the second stand. In use, the first stand is connected to the main body, and the second stand is connected to the cover. After the cover is rotated away from the main body by a predetermined angle, the protrusions of the cam disengage from the notches of the cam follower, and the cover is driven to rotate by a force of the torsion spring.

However, increased rotating speed of the cover can generate a large impact force because of the force of the torsion spring. When the protrusions of the cam engage with the notches of the cam follower again, the cover stops suddenly, experiencing a considerable impact force. The cam, the cam follower, and electronic components housed inside the cover can be easily damaged.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
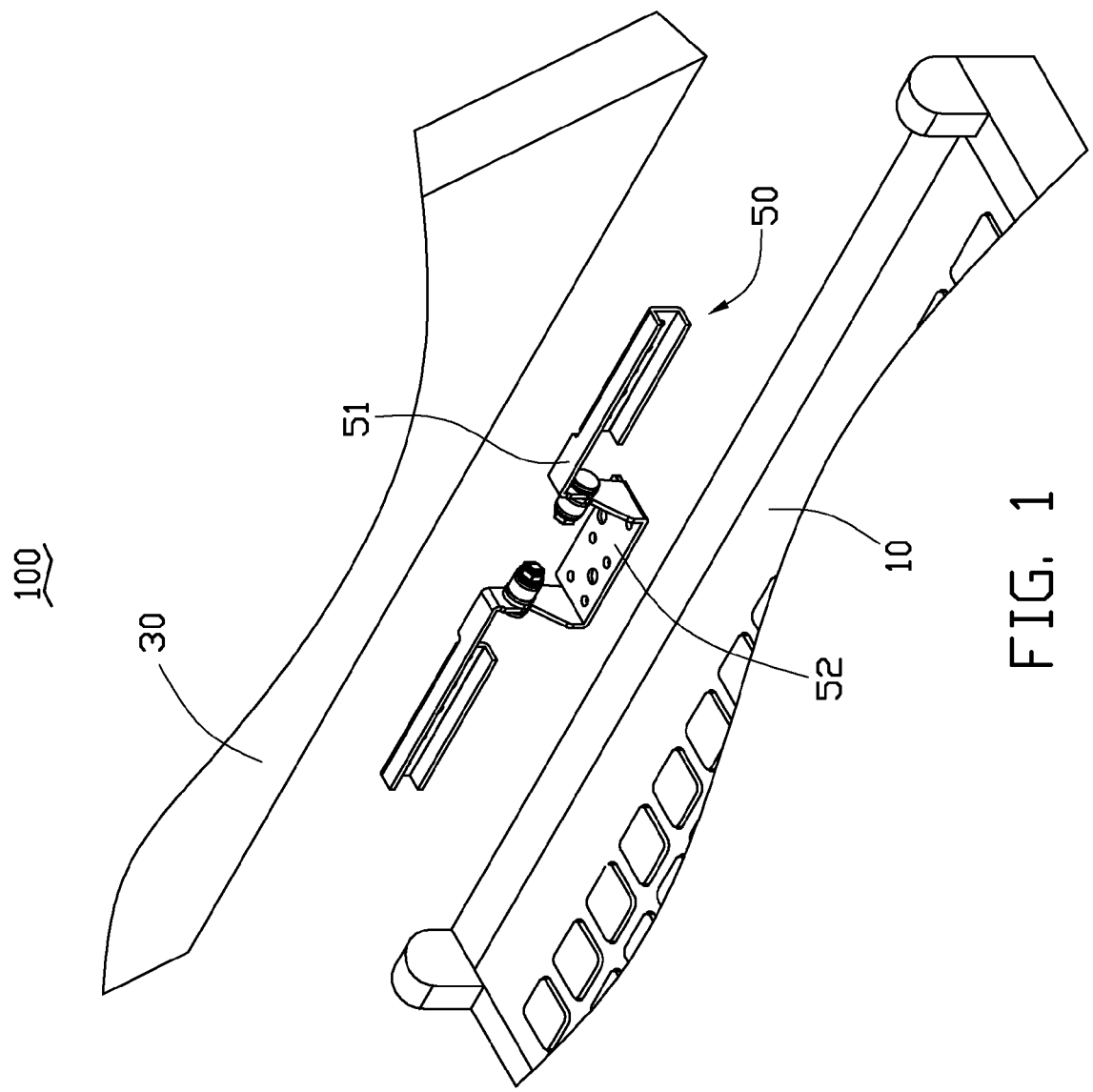
FIG. 1 is an assembled, isometric view of an electronic device as disclosed, including a main body, a cover, and a hinge assembly.

The electronic device as disclosed may be a mobile phone, notebook, or other collapsible device. Referring to FIG. 1, an embodiment of the portable electronic device is described and illustrated as a notebook 100. The notebook 100 includes a main body 10, a cover 30, and a hinge assembly 50. The hinge assembly 50 hinges the cover 30 on the main body 10.

Figure 2:
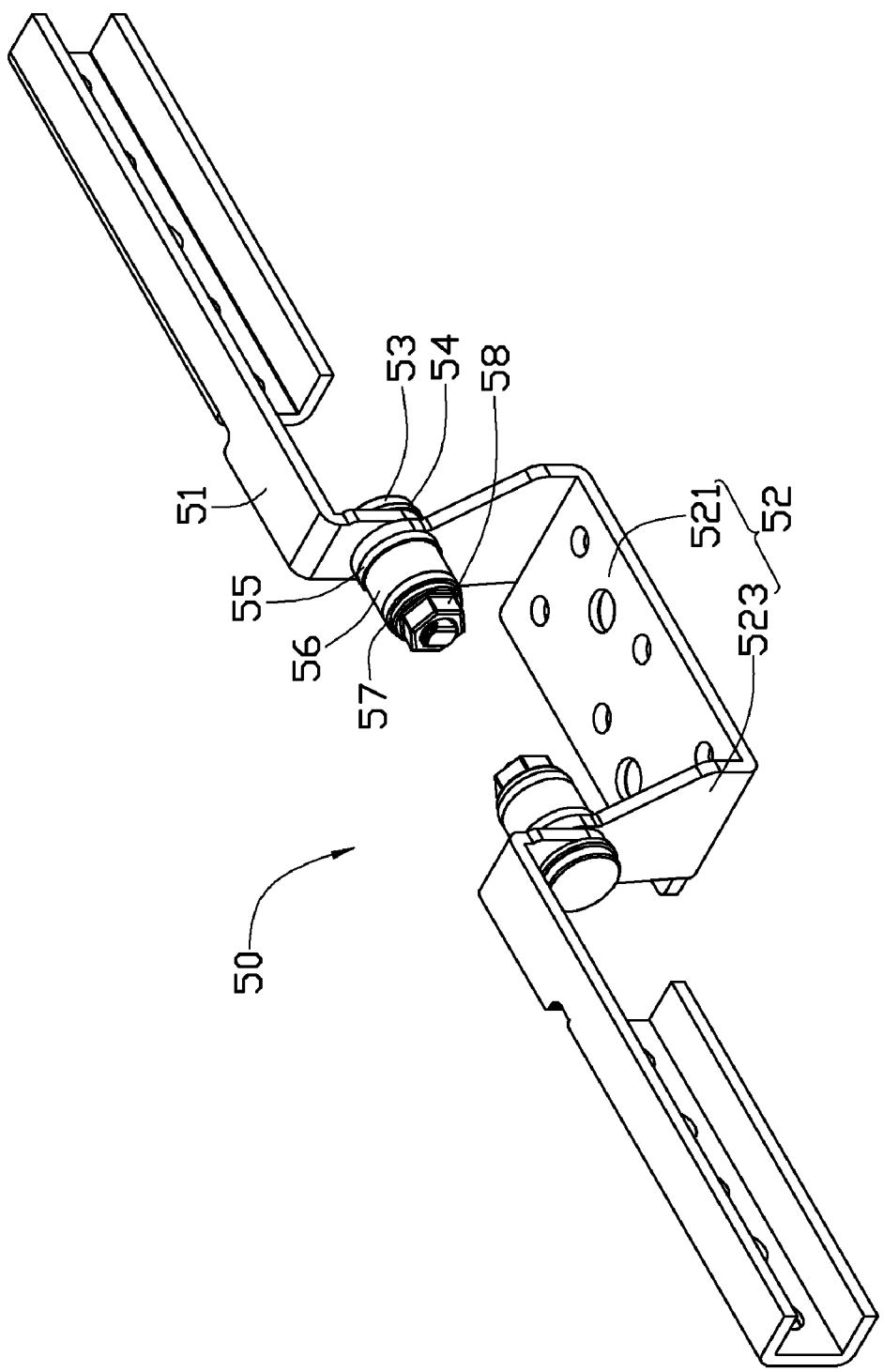
FIG. 2 is an assembled, isometric view of a hinge assembly for an electronic device, such as, for example, that of FIG. 1, the hinge assembly including two first brackets, a second bracket, and two shaft assemblies rotatably connecting the first brackets to the second bracket.

Referring to FIG. 2, the hinge assembly 50 includes two first brackets 51, a second bracket 52, and two shaft assemblies (not labeled) rotatably connecting the first brackets 51 to the second bracket 52.

Figure 3:
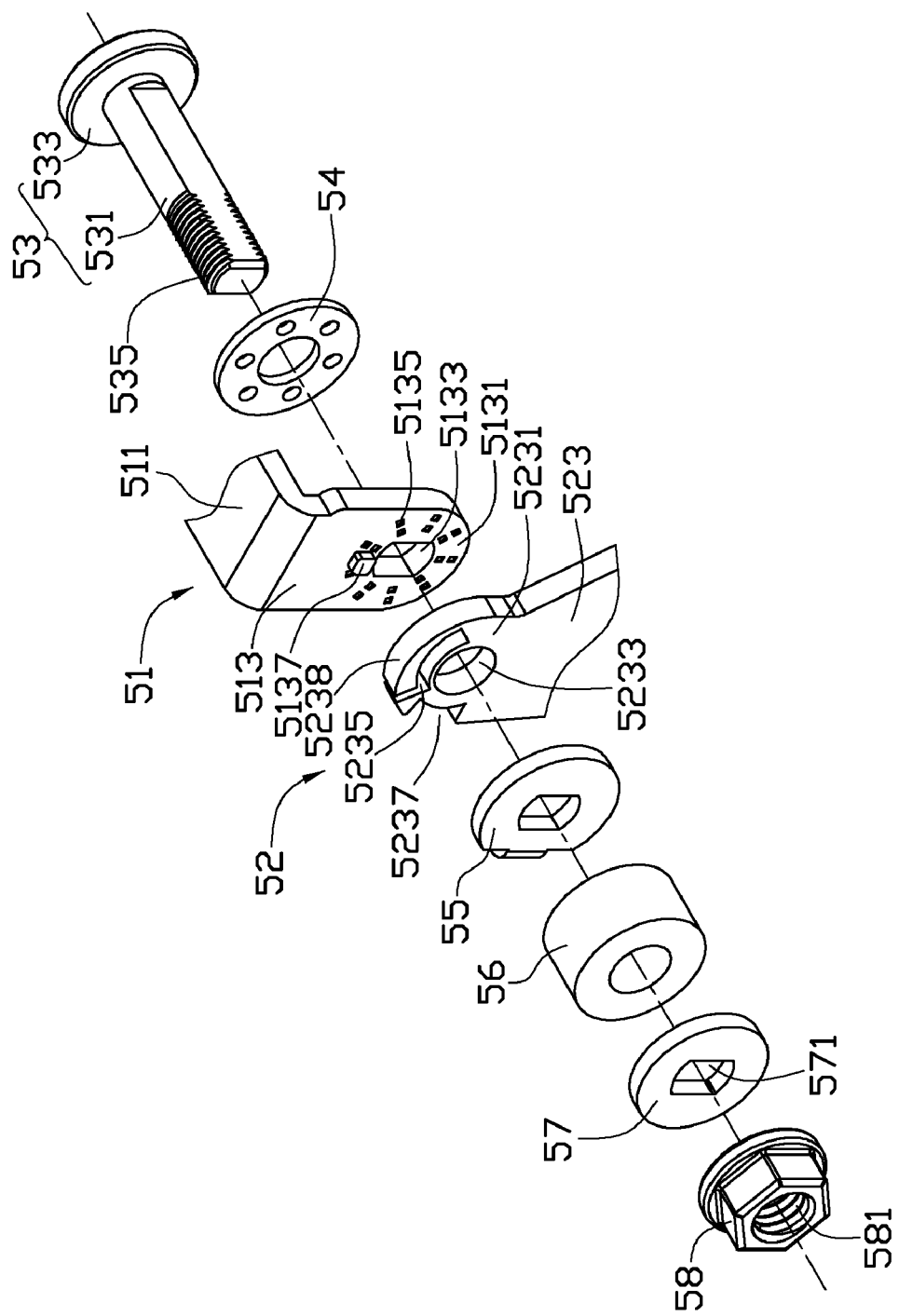
FIG. 3 is an exploded, isometric view of part of the hinge assembly of FIG. 1.
Figure 4:
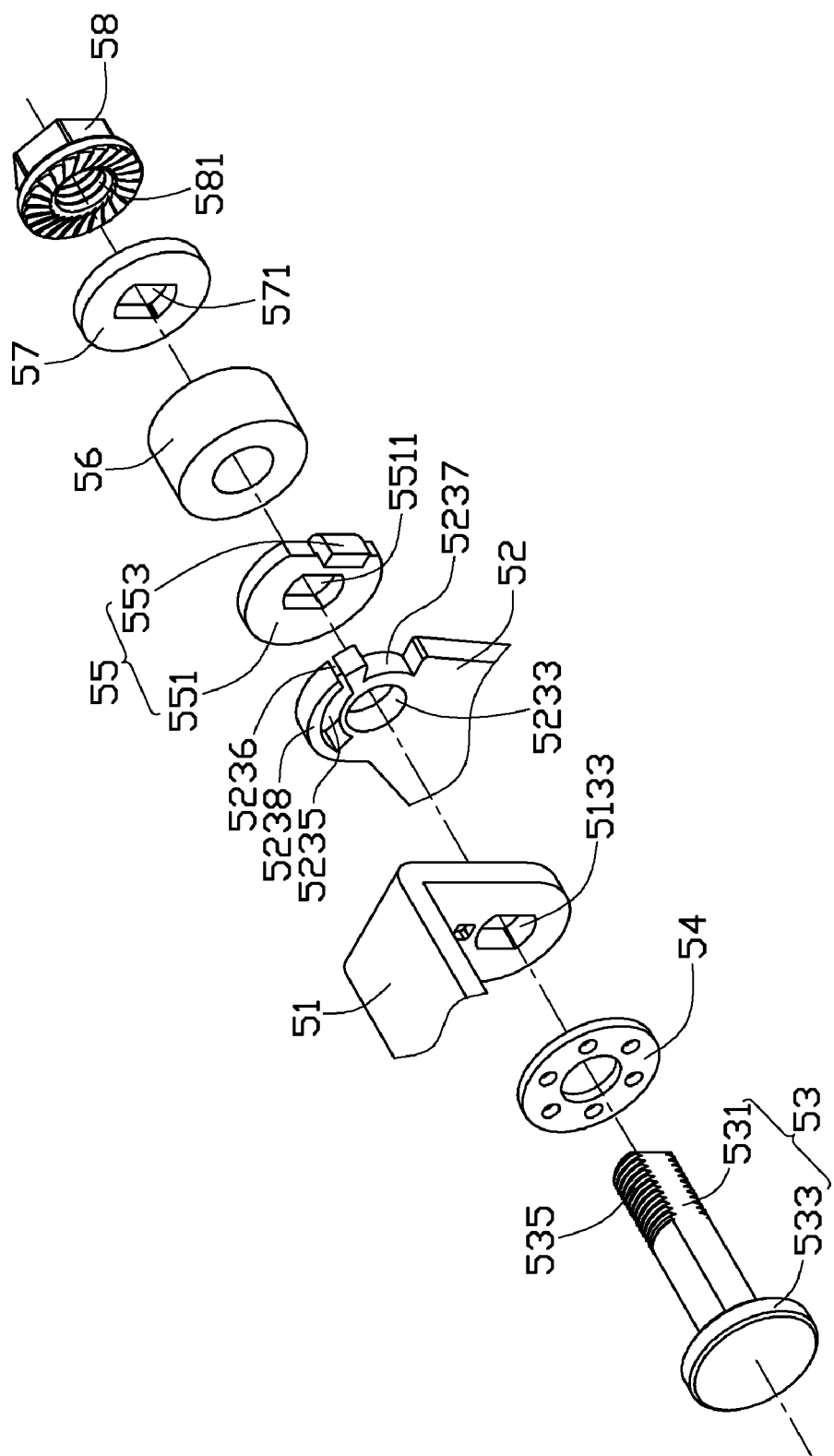
FIG. 4 is an exploded, isometric view of part of the hinge assembly of FIG. 1, viewed from another aspect.

Referring to FIG. 3 and FIG. 4, each first bracket 51 includes a first fixing plate 511 and a first connecting plate 513 connected thereto. The first connecting plate 513 has a connecting end 5131. The connecting end 5131 defines a non-circular shaft hole 5133 and a plurality of oil holes 5135 around the non-circular shaft hole 5133. The first connecting plate 513 also includes a protrusion 5137 formed on the connecting end 5131, the protrusion 5137 being elastic and having a width substantially perpendicular to the axis of the non-circular shaft hole 5133 of A (shown in FIG. 6).

The second bracket 52 includes a second fixing plate 521 and two second connecting boards 523 extending substantially perpendicular to the second fixing plate 521. The second connecting boards 523 extend at opposite ends of the second fixing plate 521, and each second connecting board 523 has a connecting portion 5231. Each connecting portion 5231 defines a circular shaft hole 5233, a curved latching slot 5235, a passing slot 5236 communicating with the curved latching slot 5235, and a restricting slot 5237. The width of the curved latching slot 5235 perpendicular to the axis of the circular shaft hole 5233 decreases along the curved extending direction, with a maximum width of B and a minimum width of C (shown in FIG. 6). The passing slot 5236 is arranged at one end of the curved latching slot 5235 with minimal width and extends to the edge of the connecting portion 5231, with a swing arm at the connecting portion 5231. The width A of the protrusion 5137 of the first bracket 51 is substantially the same as the width B of one end of the curved latching slot 5235, and exceeds the width C of the other end of the curved latching slot 5235.

Referring to FIGS. 2 and 3, each shaft assembly includes a shaft 53 passing through the first bracket 51 and the second bracket 52, a friction member 54, a restricting member 55, a resilient member 56, a spacer 57, and a fastener 58.

The shaft 53 includes a shaft portion 531 and a flange 533 formed at one end of the shaft portion 531. A threaded portion 535 is formed at one end of the shaft portion 531 far away from the flange 533. A cross-section of the shaft portion 531 perpendicular to the axis is non-circular.

The friction member 54 is rotatably sleeved on the shaft portion 531 of the shaft 53, and arranged between the flange 533 of the shaft 53 and the connecting end 5131 of the first bracket 51.

Referring to FIGS. 3 and 4, the restricting member 55 includes a base portion 551 and a restricting portion 553 bending from an edge of the base portion 551. The base portion 551 defines a non-circular shaft hole 5511 at the middle portion. The restricting portion 553 cooperates with the restricting slot 5337 of the second bracket 53 to restrict the relative rotatable angle of the first bracket 51 and the second bracket 52.

The resilient member 56 sleeves on the shaft portion 531 of the shaft 53. In the illustrated embodiment, the resilient member 56 is silicon gel, providing ample strength with smooth static friction force during rotation.

The spacer 57 sleeves on the shaft portion 531 of the shaft 53. The spacer 57 defines a non-circular shaft hole 571 to non-rotatably connect with the shaft 53.

The fastener 58 defines a threaded hole 581 cooperating with the shaft portion 535 of the shaft 53. Changing a position of the fastener 58 on the shaft 53 can adjust the force on the resilient member 56, thus changing the torsion force on the hinge assembly 50 during rotation. The fastener 58 may also connect with the shaft 53 by riveting, welding, or other means.

Referring to FIGS. 2 through 4, during assembly of the hinge assembly 50, the shaft portion 531 of one shaft 53 extends through one friction member 54, one connecting end 5131 of the first bracket 51, one connecting portion 5231 of the second bracket 52, one restricting member 55, one resilient member 56, and one spacer 57. The protrusion 5137 of the first bracket 51 is received in the curved latching slot 5235 of the second bracket 52. The restricting portion 5137 of the restricting member 55 cooperates with the restricting slot 5237 of the second bracket 52. The oil holes 5135 of the first bracket 51 face the connecting portion 5231 of the second bracket 52, and oil is received therein to lubricate the first bracket 51 and the second bracket 52. The fastener 58 engages with the threaded portion 535 of the shaft 53. Another shaft assembly is connected with the first bracket 51 and the second bracket 52 as described.

Figure 5:
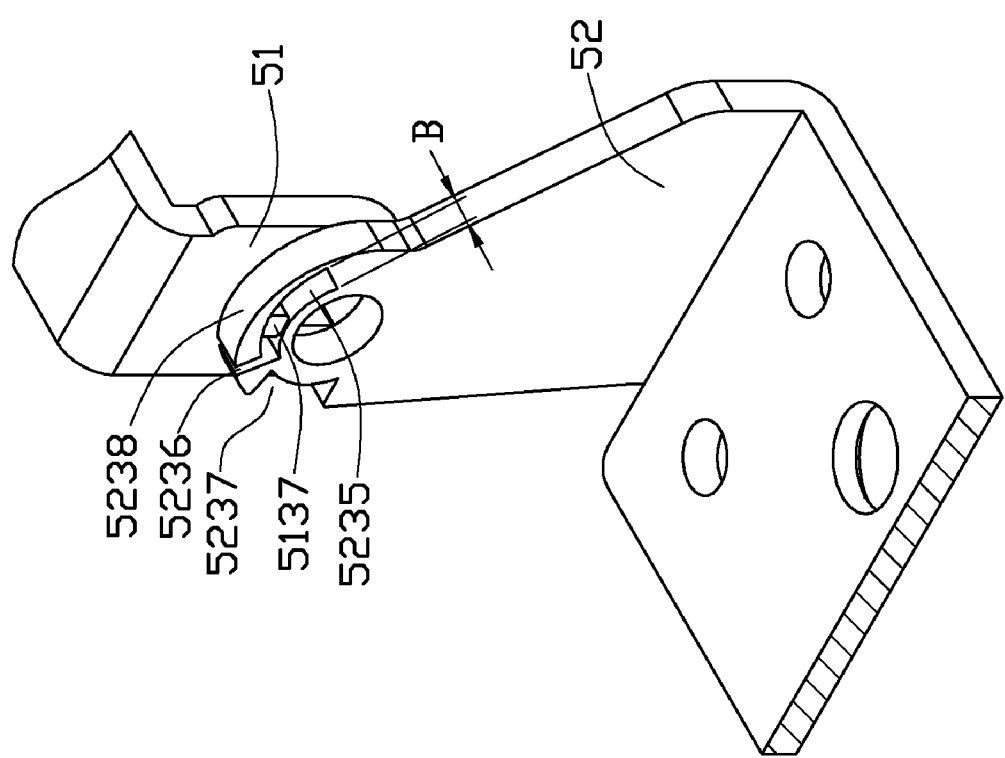
FIG. 5 is an assembled, isometric view of part of one of a first brackets and a second bracket of FIG. 2.

Referring to FIGS. 1 and 5, the first bracket 51 connects with the cover 30 of the notebook 100, and the second bracket 52 connects with the main body 10 of the notebook 100, thus, the hinge assembly 50 hinges the cover 30 on the main body 10. The curved latching slot 5235 of the second bracket 52 substantially follows the rotation of the cover 30 relative to the main body 10. When the cover 30 is latched with the main body 10, the protrusion 5137 of the first bracket 51 is positioned at one end of the curved latching slot 5235 with a maximal width, that is, the end with width B.

Figure 6:
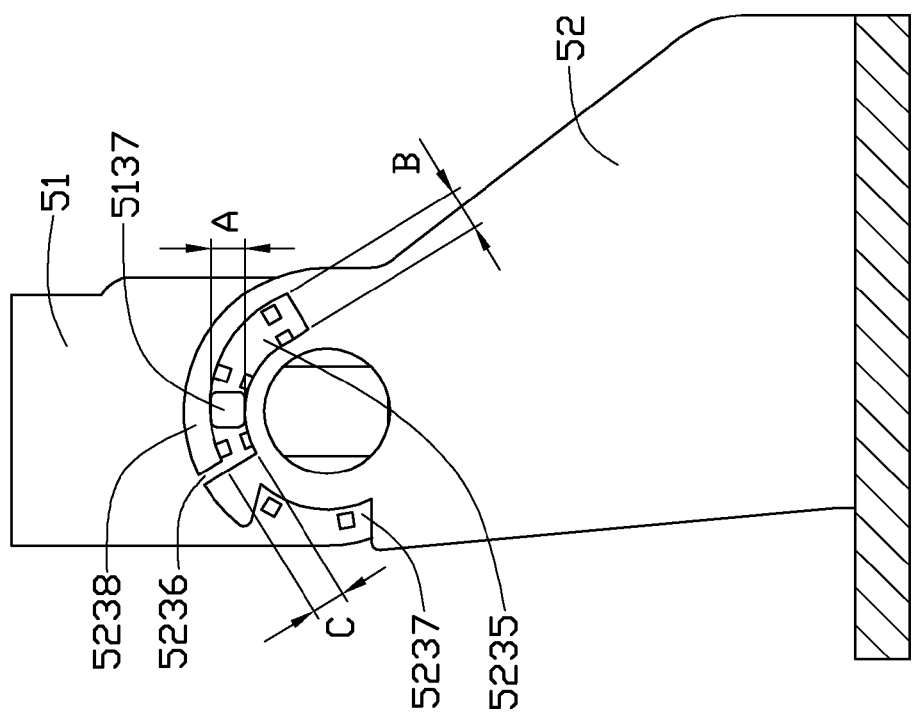
FIG. 6 is similar to FIG. 5, but viewed from another aspect.

Referring to FIGS. 1, 4, and 6, when the cover 30 rotates, the first bracket 51 and the shaft 53 rotate relative to the second bracket 52, and the protrusion 5137 slides in the curved latching slot 5235 of the second bracket 52. Since the width of the curved latching slot 5235 decreases along the rotating direction of the cover 30, friction between the protrusion 5137 and the sidewall of the curved latching slot 5235 increases commensurately. In addition, the resistance of the protrusion 5137 moves the swing arm 5238 away from the axis of the non-circular shaft hole 5133 of the first bracket 51. Accordingly as the cover 30 is opened, resistance increases. During rotation, the restricting member 55 rotates along the first bracket 51, and the restricting portion 553 of the restricting member 55 slides in the restricting slot 5237 of the second bracket 52. When the restricting portion 553 resists one end of the restricting slot 5237, the first bracket 51 cannot rotate relative to the second bracket 52, and the cover 30 remains fully open.

The hinge assembly 50 changes rotation resistance by the protrusion 5137 of the first bracket 51 sliding in the curved latching slot 5235 of the second bracket 52 with changing width, such that no other member is needed, resulting in a simple structure. The changing resistance during rotation prevents the cover 30 from impacting the main body 10 at its limit, increasing the effective lifetime of the hinge assembly 50 and the notebook 100.

Alternatively, the protrusion 5137 may be arranged on the second bracket 52, and the curved latching slot 5235 defined in the first bracket 51. The first bracket 51 may also be connected with the main body 10, and the second bracket 52 connected with the cover 30.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge assembly, comprising: a first bracket; a second bracket rotatably connected to the first bracket; a shaft assembly comprising a shaft; the shaft comprising a shaft portion; and a resilient member sleeved on the shaft portion; wherein the first bracket has a connecting end forming an elastic protrusion, and the second bracket has a connecting portion defining a curved latching slot and a passing slot communicating with the curved latching slot, a width of the curved latching slot decreases along the curved direction, and a width of the protrusion is substantially the same as a width of a first end of the curved latching slot, and exceeds the width of a second end of the curved latching slot; the passing slot is positioned at the narrowest end of the curved latching slot.

2. The hinge assembly of claim 1, wherein the shaft assembly further comprises a restricting member sleeved on the shaft and arranged between the second bracket and the resilient member.

3. The hinge assembly of claim 2, wherein the restricting member comprises a base portion and a restricting portion extending from an edge of the base portion; the second bracket defines a restricting slot cooperating with the restricting portion.

4. The hinge assembly of claim 3, wherein the shaft further comprises a flange formed on an edge of the shaft portion; the hinge assembly further comprises a friction member sleeved on the shaft portion and arranged between the flange and the first bracket.

5. The hinge assembly of claim 4, wherein an end of the shaft portion away from the flange has a threaded portion; the hinge assembly further comprises a fastener cooperating with the threaded portion.

6. The hinge assembly of claim 5, wherein the shaft assembly further comprises a spacer sleeved on the shaft portion of the shaft and arranged between the fastener and the resilient member.

7. The hinge assembly of claim 1, wherein the resilient member is silicon gel.

8. The hinge assembly of claim 1, wherein the connecting end of the first bracket defines a plurality of oil holes facing the connecting portion of the second bracket.

9. An electronic device, comprising: a main body;
 a cover connected to the main body; and a hinge assembly hinging the main body on the cover, the hinge assembly comprising a first bracket, a second bracket, and a shaft assembly rotatably connecting the first bracket to the second bracket, the shaft assembly comprising a shaft passing through the first bracket and the second bracket, the shaft comprising a shaft portion; and a resilient member sleeved on the shaft portion; wherein one of the first bracket and the second bracket connects with the main body and the other one of the first bracket and the second bracket connects with the cover; the first bracket has a connecting end forming an elastic protrusion; the second bracket has a connecting portion defining a curved latching slot and a passing slot communicating with the curved latching slot; a width of the curved latching slot decreases along the curved extending direction, and a width of the protrusion is substantially the same as a width of a first end of the curved latching slot, and exceeds a width of a second end of the curved latching slot; the passing slot is positioned at the narrowest end of the curved latching slot.

10. The electronic device of claim 9, wherein the shaft further comprises a flange formed at an end of the shaft portion.

11. The electronic device of claim 10, wherein the shaft assembly further comprises a restricting member sleeved on the shaft and arranged between the second bracket and the resilient member.

12. The electronic device of claim 11, wherein the restricting member comprises a base portion and a restricting portion extending from the edge of the base portion; the second bracket defines a restricting slot cooperating with the restricting portion.

13. The electronic device of claim 12, wherein the hinge assembly further comprises a friction member sleeved on the shaft portion and arranged between the flange and the first bracket.

14. The electronic device of claim 12, wherein an end of the shaft portion far away from the flange has a threaded portion; the hinge assembly further comprises a fastener cooperating with the threaded portion.

15. A hinge assembly, comprising: a first bracket having an elastic protrusion; a second bracket rotatably connected to the first bracket, the second bracket having a swing arm to engage with the elastic protrusion; and a shaft assembly comprising a shaft, the shaft comprising a shaft portion; and a resilient member sleeved on the shaft portion , the shaft passing through the first bracket, the second bracket, and the resilient member; wherein when the first bracket rotates relative to the second bracket in a first direction, the engagement of the elastic protrusion and the swing arm loosens; when the first bracket rotates relative to the second bracket in an opposite second direction, the engagement of the elastic protrusion and the swing arm tightens.

16. The electronic device of claim 15, wherein the second bracket further comprises a connecting portion on which the swing arm is formed; the connecting portion and the swing arm cooperatively define a curved latching slot having a first end and a second end and a passing slot communicating with the curved latching slot via the first end; the size of the curved latching slot increases with increasing distance from the first end.

17. The electronic device of claim 16, wherein the shaft further comprises a flange formed at an end of the shaft portion.

18. The electronic device of claim 17, wherein the shaft assembly further comprises a restricting member sleeved on the shaft and arranged between the second bracket and the resilient member.

19. The electronic device of claim 18, wherein the restricting member includes a base portion and a restricting portion extending from an edge of the base portion; the second bracket defines a restricting slot cooperating with the restricting portion.

20. The electronic device of claim 19, wherein the hinge assembly further comprises a friction member sleeved on the shaft portion and arranged between the flange and the first bracket.

* * * * *